United States Patent
Cauthen et al.

(10) Patent No.: US 10,926,958 B1
(45) Date of Patent: Feb. 23, 2021

(54) EXTENDIBLE BELT CONVEYOR AND CABLE MANAGEMENT SYSTEM FOR SAME

(71) Applicant: MHS Equipment, LLC, Mount Washington, KY (US)

(72) Inventors: Joseph Cauthen, Louisville, KY (US); Carl David Graston, Sellersburg, IN (US); Paul Receveur, New Albany, IN (US)

(73) Assignee: MHS Equipment, LLC, Mt. Washington, KY (US)

( * ) Notice: Subject to any disclaimer, the term of this patent is extended or adjusted under 35 U.S.C. 154(b) by 0 days.

(21) Appl. No.: 16/404,966

(22) Filed: May 7, 2019

Related U.S. Application Data (60) Provisional application No. 62/730,372, filed on Sep. 12, 2018.

(51) Int. Cl.
*B65G 21/14* (2006.01)
*B65G 21/10* (2006.01)
*B65G 15/26* (2006.01)

(52) U.S. Cl.
CPC .................................. *B65G 21/14* (2013.01)

(58) Field of Classification Search
None
See application file for complete search history.

(56) References Cited

U.S. PATENT DOCUMENTS

| | | | | |
|---|---|---|---|---|
| 6,006,893 A * | 12/1999 | Gilmore | ................ | B65G 67/08 198/588 |
| 6,481,563 B1 * | 11/2002 | Gilmore | ................ | B65G 21/14 198/511 |
| 7,108,125 B2 * | 9/2006 | Gilmore | ............... | A61K 9/0019 198/313 |
| 7,370,753 B2 * | 5/2008 | Yang | ...................... | B65G 21/14 193/35 TE |
| 8,074,767 B1 * | 12/2011 | Denison | .................... | E06C 5/04 182/42 |
| 10,435,246 B2 * | 10/2019 | Baek | .................. | B65G 21/2072 |

(Continued)

OTHER PUBLICATIONS

Santa Rosa Systems, Inc., "Multi-Stage Telescopic Belt Conveyors," Marketing Brochure, Nov. 2013.

*Primary Examiner* — Kavel Singh
(74) *Attorney, Agent, or Firm* — Stites & Harbison, PLLC; David W. Nagle, Jr.; James R. Hayne (57) ABSTRACT

In an extendible belt conveyor with a boom mounted for movement with respect to a penultimate section and a cable extending from user controls on the boom to the penultimate section, a cable management system may include a first pulley mounted to an underside of the penultimate section and a second pulley mounted to the underside of the penultimate section, with a distance between the first pulley and the second pulley adjusted to maintain tension in the cable. The cable management system may also include a first shoe mounted to an underside of the boom near the penultimate section and a second shoe mounted to the underside of the penultimate section near the boom. The first shoe defines a channel for receiving the cable and the second shoe defines a channel for receiving the cable, with the cable passing around the first shoe and then around the second shoe.

18 Claims, 7 Drawing Sheets

(56) References Cited

U.S. PATENT DOCUMENTS

2002/0153229 A1\* 10/2002 Gilmore ................. B65G 21/20
 198/568
2006/0260913 A1\* 11/2006 Wolf ...................... B65G 67/08
 198/812

\* cited by examiner

EXTENDIBLE BELT CONVEYOR AND CABLE MANAGEMENT SYSTEM FOR SAME

CROSS-REFERENCE TO RELATED APPLICATIONS

The present application claims priority to U.S. Patent Application Ser. No. 62/730,372 filed on Sep. 12, 2018, the entire disclosure of which is incorporated herein by reference.

BACKGROUND OF THE INVENTION

Extendible belt conveyors are known in the industry and are used to offer an extended range or reach, while maintaining a minimal footprint when the conveyor is in a retracted position. For example, such extendible belt conveyors provide advantages relating to ergonomics, productivity, and floor utilization by allowing a greater range of locations of the distal end of the conveyor. Specifically, such extendible belt conveyors often include multiple telescoping sections that extend from a base. Furthermore, many such extendible belt conveyors include a boom, which is mounted for pivotal movement with respect to the last telescoping section (or penultimate section), so that it can be positioned in a substantially horizontal orientation where it serves as the final section of the conveying surface, or it can be pivoted into a substantially vertical orientation (or a stowed position). As with all adjustable equipment with moving parts, care must be taken with respect to the wear of those parts of the equipment which move as the boom moves between positions.

SUMMARY OF THE INVENTION

The present invention is an extendible belt conveyor that includes a cable management system which reduces wear to electronic cables as the boom moves between positions.

An exemplary extendible belt conveyor made in accordance with the present invention includes a base with multiple telescoping sections and a boom, which is mounted for pivotal movement with respect to the adjacent telescoping section, which may also be referred to as the penultimate section. The boom does not retract into the penultimate section in a telescoping relationship. Rather, the boom is mounted to the penultimate section, such that it can pivot about a substantially horizontal axis relative to the penultimate section between a substantially horizontal orientation where it serves as the final section of the conveying surface and a substantially vertical orientation, where it is in a stowed position.

The penultimate section includes a belt which is operated, in part, by a roller at a distal end of the penultimate section. Likewise, the boom includes a belt which is operated, in part, by a roller at a proximal end of the boom. Thus, parcels are transferred from the conveying surface defined by the belt of the penultimate section to the conveying surface defined by the belt of the boom, or vice versa. User controls for controlling operation of the conveyor are located on one or both side surfaces of the boom. Therefore, it is necessary to include an electronic cable (or cable) that extends from such user controls and operably connects the controls to the other telescoping sections and the base of the extendible belt conveyor, and to a power source. However, the pivoting movement of the boom relative to the penultimate section of the extendible belt conveyor must be taken into account in managing the cable.

To this end, the extendible belt conveyor of the present invention includes a cable management system with various components that cooperate to manage the cable during movement of the boom relative to the penultimate section.

In some embodiments, a first shoe is mounted to the underside of the boom near the proximal end of the boom, and a second shoe is mounted to the underside of the penultimate section near the distal end of the penultimate section. The first shoe defines a channel for receiving the cable, and the second shoe similarly defines a channel for receiving the cable, such that the cable passes around the first shoe, and then around the second shoe.

As the boom pivots relative to the penultimate section of the extendible belt conveyor to the stowed position, the position of the cable relative to the first shoe remains substantially fixed. However, such pivoting movement pulls the cable and causes it to slide over the second shoe. Accordingly, there must be additional cable to accommodate the pivoting of the boom.

In some embodiments, a pulley subsystem effectively provides such additional cable. Specifically, in one preferred embodiment, the cable passes around and engages, in order, a first pulley, a second pulley, and a third pulley of the pulley subsystem. The first pulley is mounted for rotation with respect to a frame member of the penultimate section, so as to be fixed in position relative to the penultimate section. Likewise, the third pulley is mounted for rotation with respect to another frame member of the penultimate section, so as to be fixed in position relative to the penultimate section. However, the second pulley is mounted for rotation with respect to an arm, which itself is pivotally mounted to another frame member of the penultimate section. As a result, while the positions of the first pulley and the third pulley are fixed relative to the penultimate section, the second pulley can move closer to the first pulley and the third pulley, as the arm pivots relative to the third frame member, when additional cable is needed. However, a spring biases this arm away from the first pulley and the third pulley. Thus, when additional cable is no longer needed, i.e., when the boom is being pivoted out of the stowed position, the pulley subsystem accounts for and "captures" the additional cable. In short, the pulley subsystem maintains tension in the cable.

DESCRIPTION OF THE INVENTION

The present invention is an extendible belt conveyor that includes a cable management system which reduces wear to electronic cables as the boom moves between positions.

Figure 1:
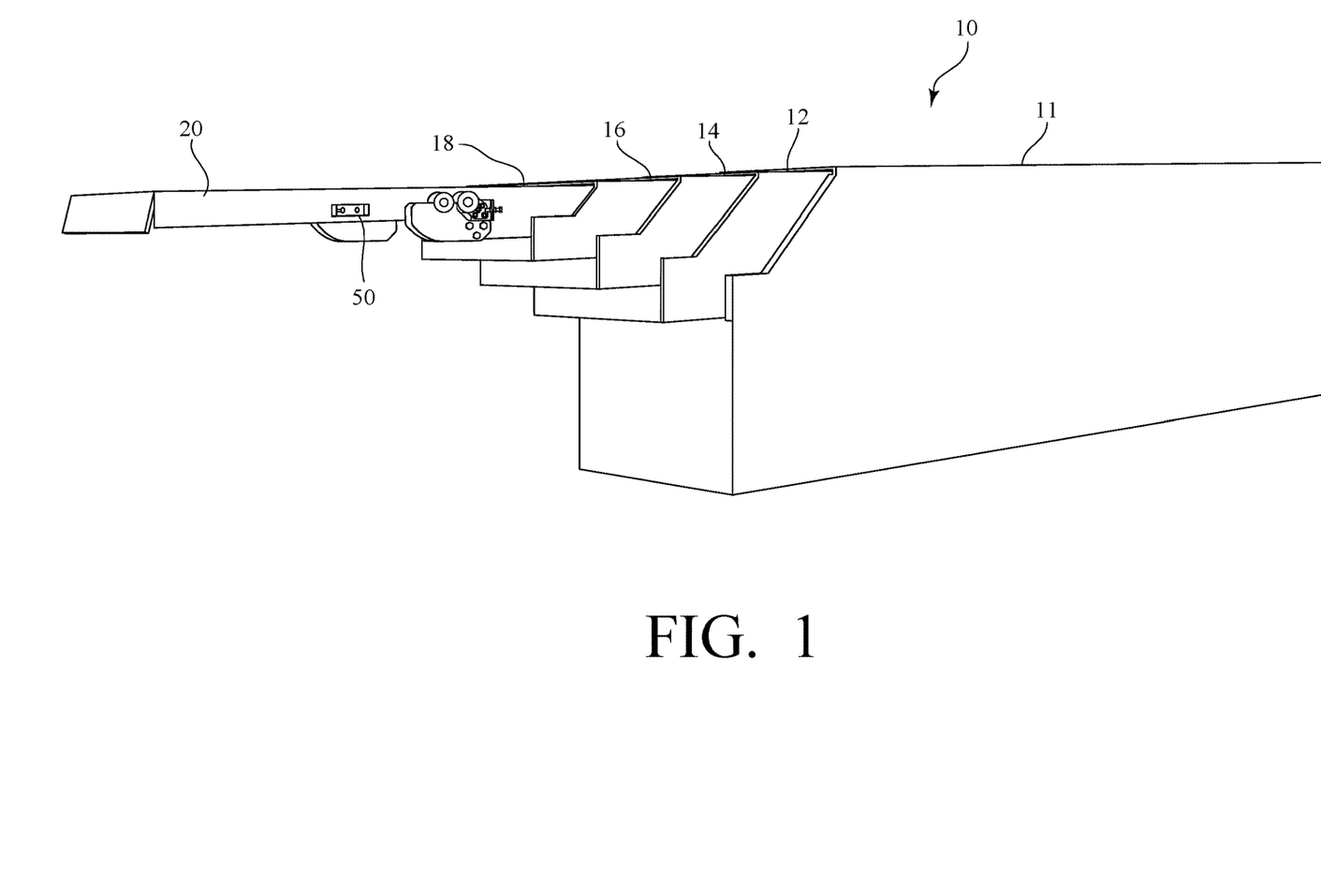
FIG. 1 is a perspective view of an exemplary extendible belt conveyor made in accordance with the present invention, in which the telescoping sections of the conveyor are in a retracted position.
Figure 1A:
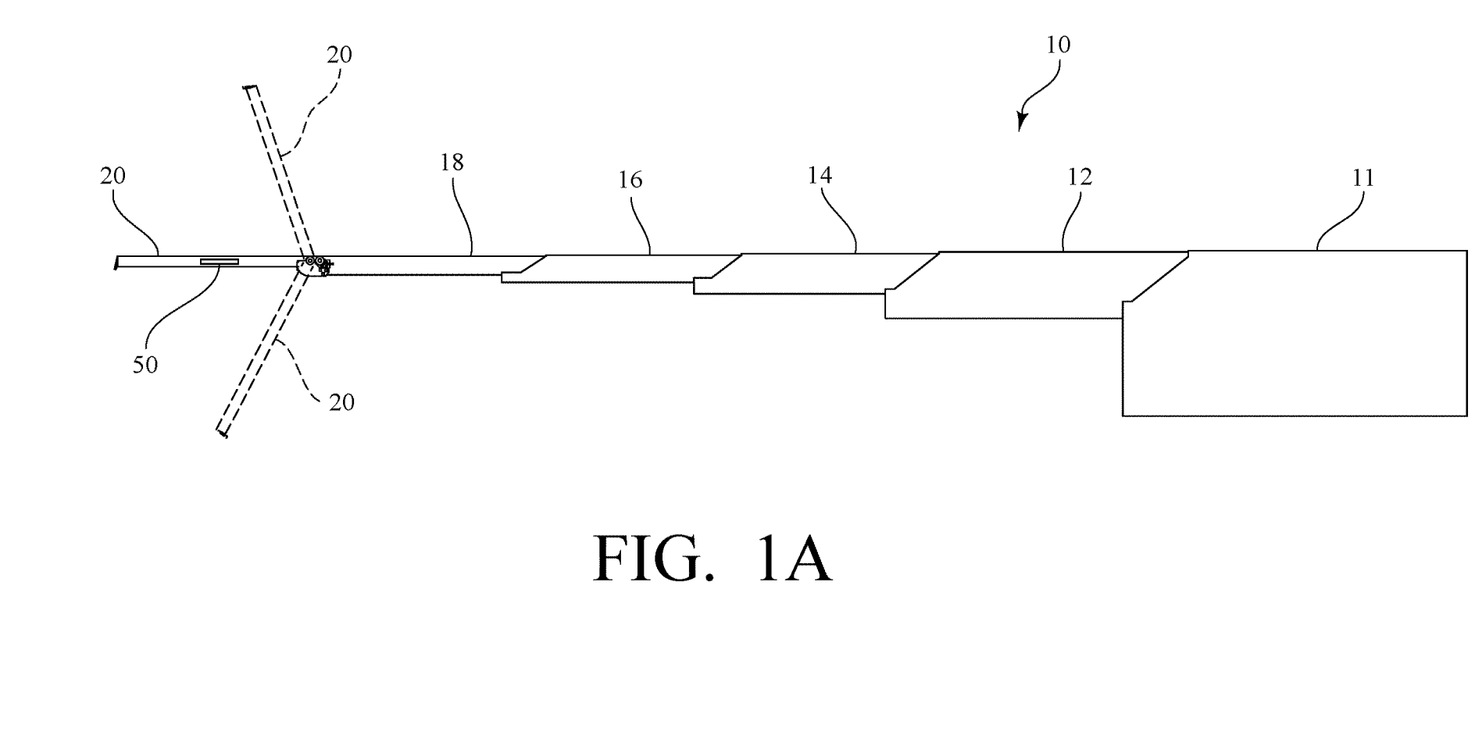
FIG. 1A is a side view of the exemplary extendible belt conveyor of FIG. 1, in which the telescoping sections of the conveyor are in an extended position.
Figure 2:
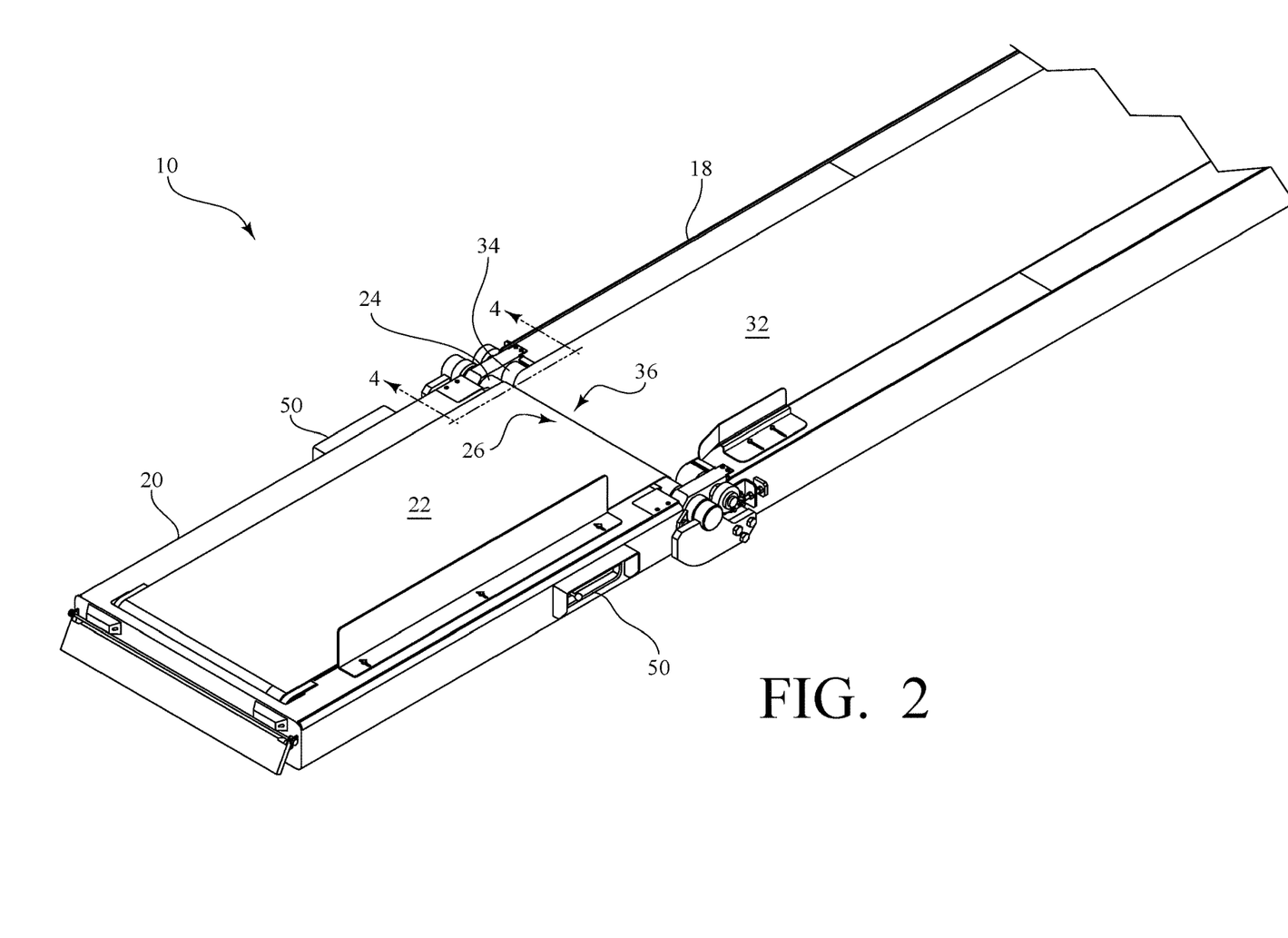
FIG. 2 is a partial top perspective view of the exemplary extendible belt conveyor of FIGS. 1 and 1A.

FIG. 1 is a perspective view of an exemplary extendible belt conveyor 10 made in accordance with the present invention in a retracted position, and FIG. 1A is a side view of the extendible belt conveyor 10 in an extended position. As shown in FIGS. 1 and 1A, the extendible belt conveyor 10 includes a base 11 with multiple telescoping sections 12, 14, 16, 18, each of which define a conveying surface. In this example, there are four such telescoping sections 12, 14, 16, 18, although fewer or more telescoping sections could be incorporated into the extendible belt conveyor 10 without departing from the spirt and scope of the present invention. Furthermore, as also shown in FIGS. 1 and 1A, the extendible belt conveyor 10 includes a boom 20, which is mounted for pivotal movement with respect to the adjacent telescoping section 18, which may also be referred to as the penultimate section 18.

As best shown in FIG. 1A, the boom 20 of the extendible belt conveyor 10 does not retract into the penultimate section 18 in a telescoping relationship. Rather, the boom 20 is mounted to the penultimate section 18, such that it can pivot about a substantially horizontal axis relative to the penultimate section 18 between a substantially horizontal orientation where it serves as the final section of the conveying surface and a substantially vertical orientation, where it is in a stowed position. In most cases, it is presumed that the boom 20 would be pivoted upward into the stowed position. However, it is also possible that the boom 20 could be pivoted downward into the stowed position.

Figure 4:
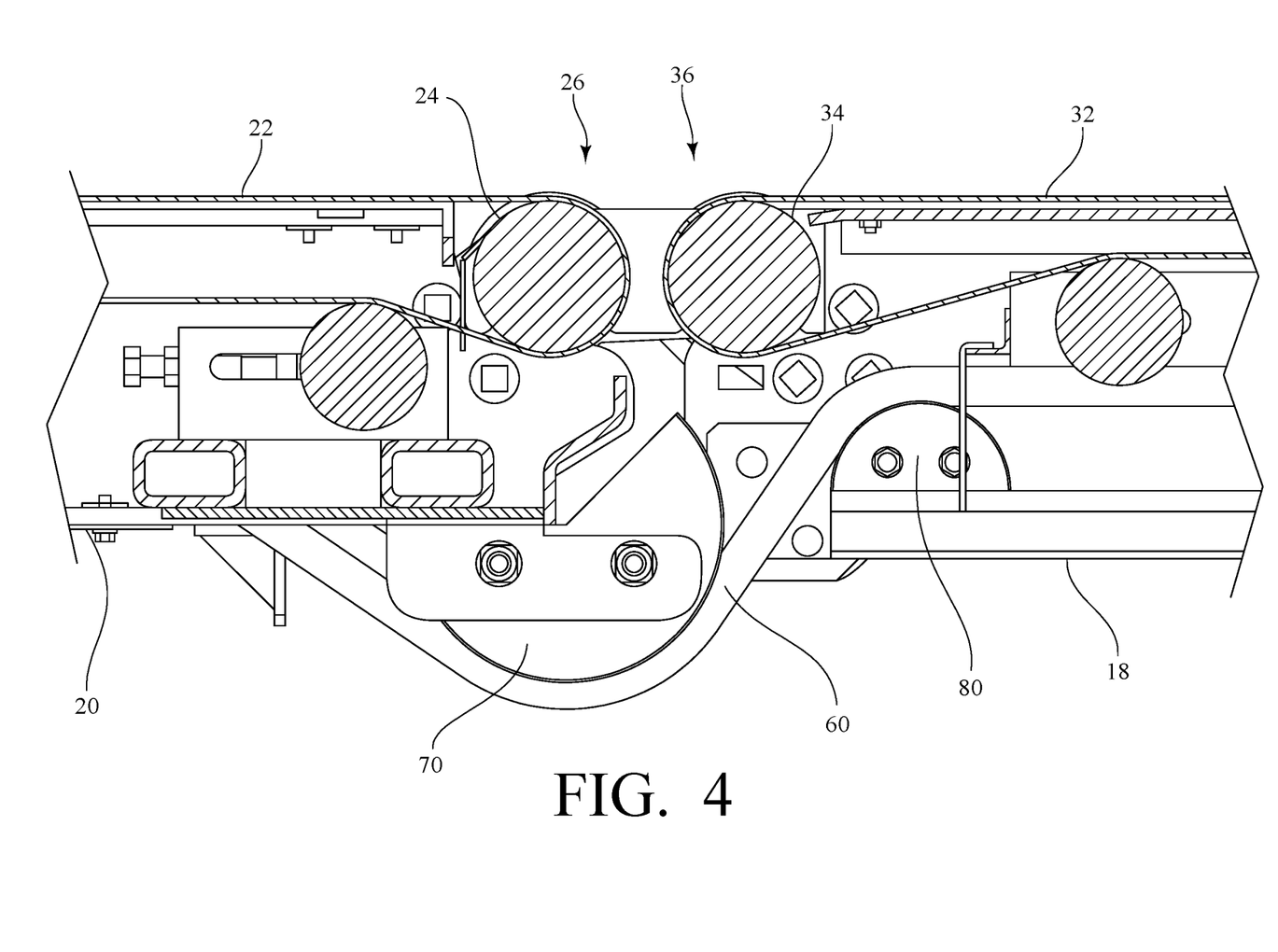
FIG. 4 is a partial sectional view of the exemplary extendible belt conveyor of FIG. 2 taken along line 4-4 in FIG. 2 and FIG. 3, illustrating components of an exemplary cable management system made in accordance with the present invention.

Referring again to FIGS. 1 and 1A, along with the partial sectional view of FIG. 4, the penultimate section 18 includes a belt 32 which is operated, in part, by a roller 34 at a distal end 36 of the penultimate section 18. Likewise, the boom 20 includes a belt 22 which is operated, in part, by a roller 24 at a proximal end 26 of the boom 20. Thus, parcels (not shown) are transferred from the conveying surface defined by the belt 32 to the conveying surface defined by the belt 22, or vice versa.

Figure 3:
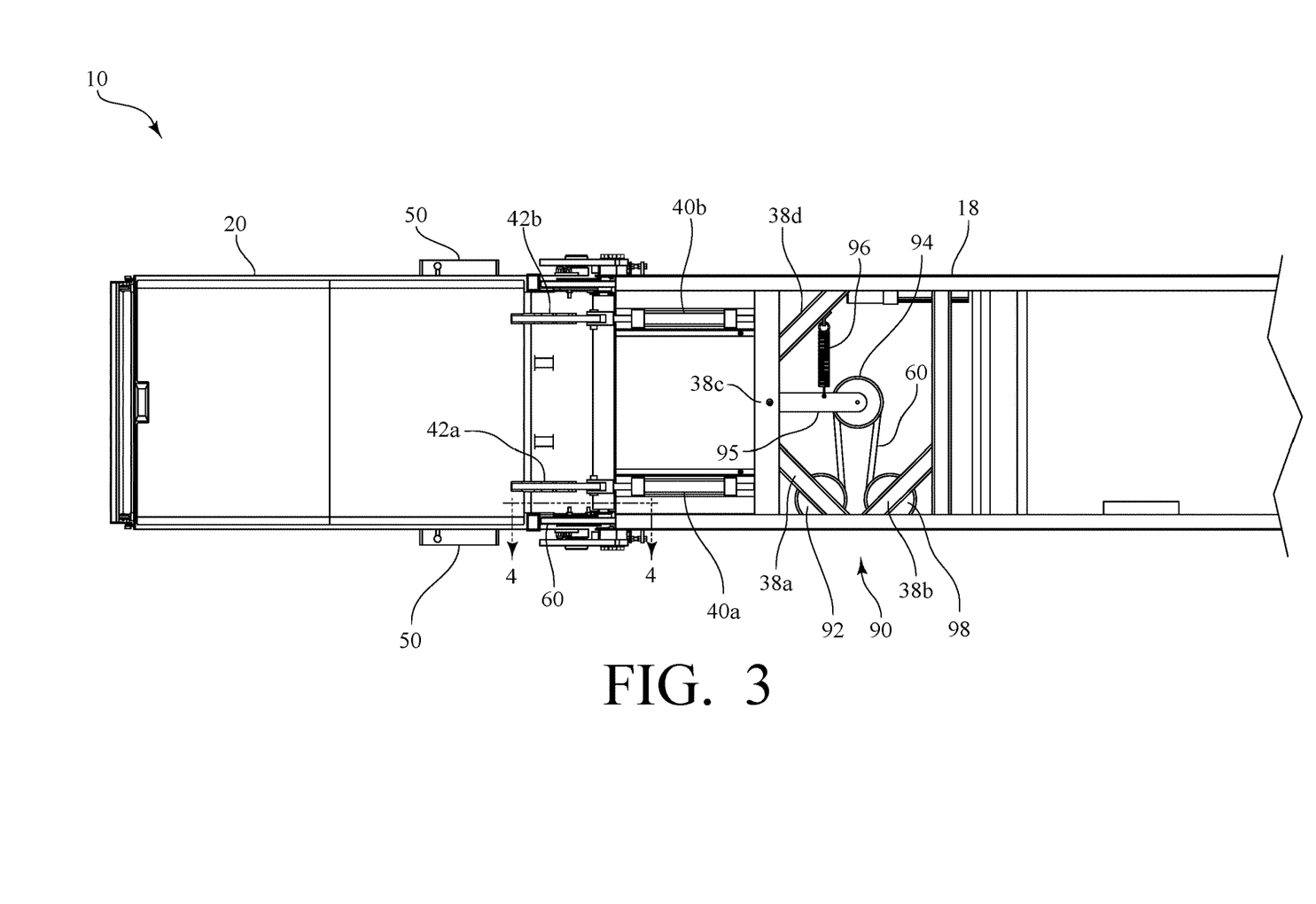
FIG. 3 is a partial bottom view of the exemplary extendible belt conveyor of FIG. 2.

FIG. 3 is a partial bottom view of the exemplary extendible belt conveyor of FIGS. 1 and 1A. As shown in FIG. 3, in this exemplary embodiment, there are two hydraulic cylinders 40a, 40b and associated linkages 42a, 42b, which facilitate pivoting of the boom 20 relative to the penultimate section 18 of the extendible belt conveyor 10.

In the extendible belt conveyor 10, user controls for controlling operation of the conveyor, which are generally indicated by reference number 50, are located on one or both side surfaces of the boom 20. Therefore, it is necessary to include an electronic cable (or cable) 60 that extends from such user controls 50 and operably connects the controls 50 to the other telescoping sections 12, 14, 16, 18 and the base 11 of the extendible belt conveyor 10, and to a power source. However, the pivoting movement of the boom 20 relative to the penultimate section 18 of the extendible belt conveyor 10 must be taken into account in managing the cable 60.

To this end, the extendible belt conveyor 10 of the present invention further includes a cable management system with various components that cooperate to manage the cable 60 during movement of the boom 20 relative to the penultimate section 18.

Figure 5:
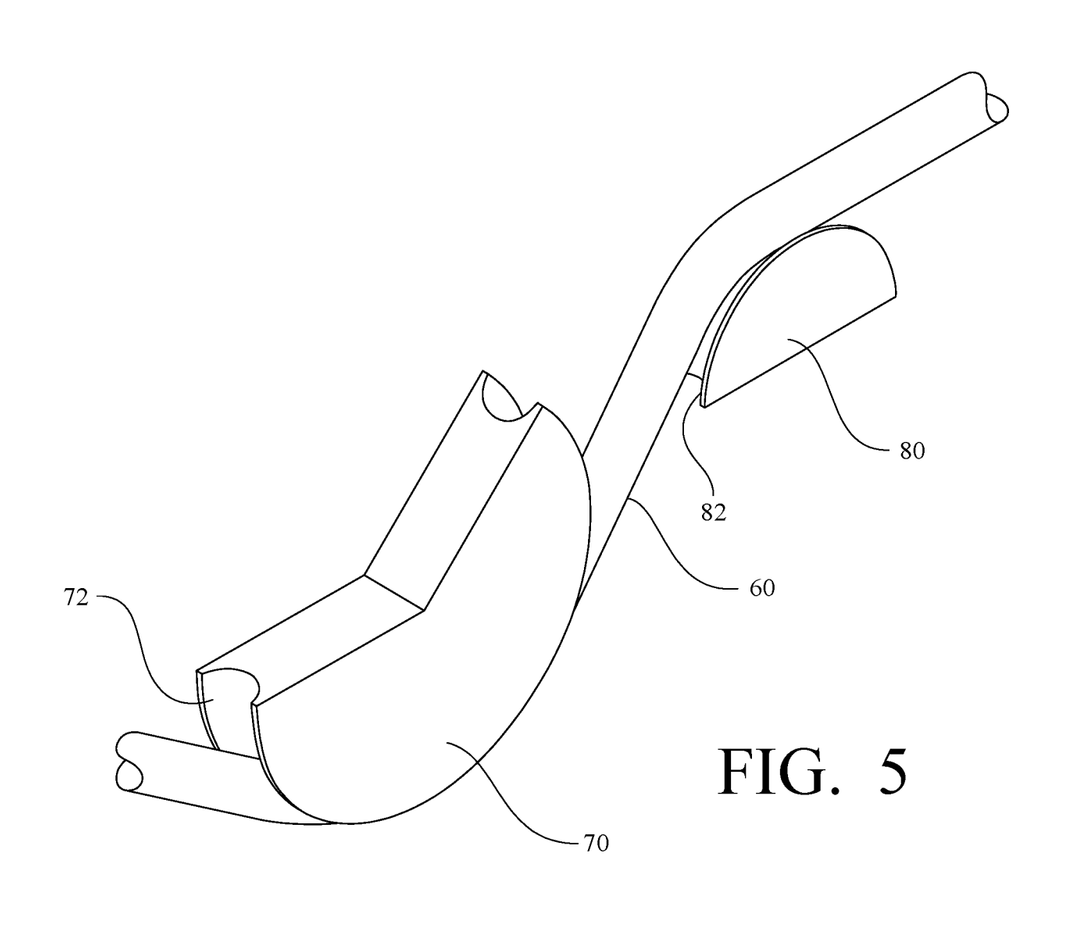
FIG. 5 is a perspective view illustrating, in isolation, the first shoe and the second shoe of the exemplary cable management system of FIG. 4.

In particular, and referring now to FIGS. 4 and 5, a first shoe 70 is mounted to the underside of the boom 20 near the proximal end 26 of the boom 20, and a second shoe 80 is mounted to the underside of the penultimate section 18 near the distal end 36 of the penultimate section 18. As best shown in FIG. 5, the first shoe 70 defines a channel 72 for receiving the cable 60, and the second shoe 80 similarly defines a channel 82 for receiving the cable 60. The cable 60 extends from the user controls 50, passes around (below) the first shoe 70, and then around (above) the second shoe 80. The channel 72 of the first shoe 70 and the channel 82 of the second shoe 80 are substantially aligned. That is to say, the first shoe 70 and the second shoe 80 are aligned in a plane. This alignment limits lateral strain on the cable 60 during movement of the boom 20.

As the boom 20 pivots relative to the penultimate section 18 of the extendible belt conveyor 10 to the stowed position (i.e., clockwise in FIG. 4 to a substantially vertical orientation), the position of the cable 60 relative to the first shoe 70 remains substantially fixed. However, such pivoting movement pulls the cable 60 and causes it to slide over the second shoe 80 (i.e., to the left in FIG. 3). Accordingly, there must be additional cable to accommodate the pivoting of the boom 20.

Figure 6:
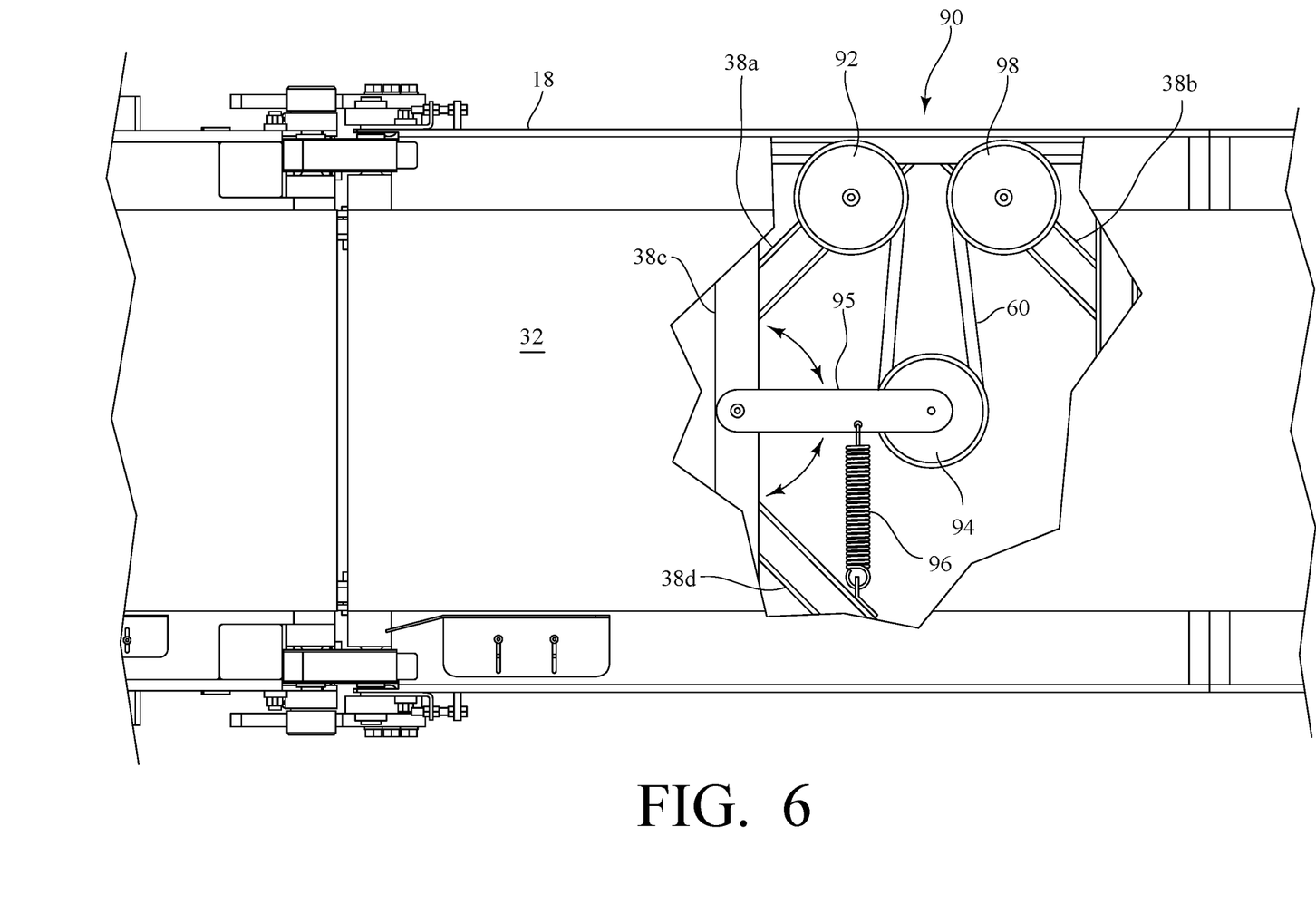
FIG. 6 is a top view of the exemplary extendible belt conveyor of FIG. 2, with a cutout illustrating additional components of an exemplary cable management system made in accordance with the present invention.

Referring now to FIG. 3 and FIG. 6, a pulley subsystem 90 effectively provides such additional cable. Specifically, the cable 60 passes around and engages, in order, a first pulley 92, a second pulley 94, and a third pulley 98 of the pulley subsystem 90. The first pulley 92 is mounted for rotation with respect to a frame member 38a of the penultimate section 18, so as to be fixed in position relative to the penultimate section 18. Likewise, the third pulley 98 is mounted for rotation with respect to another frame member 38b of the penultimate section 18, so as to be fixed in position relative to the penultimate section 18. However, the second pulley 94 is mounted for rotation with respect to an arm 95, which itself is pivotally mounted to another frame member 38c of the penultimate section 18. As a result, while the positions of the first pulley 92 and the third pulley 98 are fixed relative to the penultimate section 18, the second pulley 94 can move closer to the first pulley 92 and the third pulley 98, as the arm 95 pivots relative to the frame member 38c, when additional cable is needed. However, a spring 96, which extends between and is connected to the arm 95 and another frame member 38d of the penultimate section 18, biases this arm 95 away from the first pulley 92 and the third pulley 98. Thus, when additional cable is no longer needed, i.e., when the boom 20 is being pivoted out of the stowed position, the pulley subsystem 90 accounts for and "captures" the additional cable. In short, the pulley subsystem 90 maintains tension in the cable 60. Similar to the first and second shoes 70, 80 discussed above, the first pulley 92, the second pulley 94, and the third pulley 98 are all substantially aligned in the same plane. More specifically, the plane of the pulleys 92, 94, 98 is substantially aligned with the top of the second shoe 80 and is perpendicular to the plane of the first and second shoes 70, 80. In this way, the cable 60 is substantially constrained in two planes, thus limiting the number of turns or twists subjected to the cable 60.

As a further refinement, although not shown in the Figures, in some embodiments, the ends of the cable 60 are provided with strain relief grips (such as wire mesh grips) to minimize the possibility of damage to the cable 60 at the point of connection due to tension in the cable 60.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. An extendible belt conveyor, comprising:
   a base;
   multiple telescoping sections, including a penultimate section;
   a boom mounted for movement with respect to the penultimate section, the boom including user controls on a surface thereof for controlling operation of the extendible belt conveyor;
   a cable extending from the user controls;
   a first pulley mounted to an underside of the penultimate section, the first pulley engaging the cable, with the cable contacting and passing around the first pulley;
   a second pulley mounted to the underside of the penultimate section, the second pulley engaging the cable, with the cable contacting and passing around the second pulley;
   a first shoe mounted to an underside of the boom near the penultimate section, the first shoe defining a channel for receiving the cable; and
   a second shoe mounted to the underside of the penultimate section near the boom, the second shoe defining a channel for receiving the cable;
   wherein a distance between the first pulley and the second pulley is adjustable to maintain tension in the cable;
   wherein the cable passes around the first shoe and then around the second shoe.

2. The extendible belt conveyor as recited in claim 1, wherein the first pulley is fixed in position relative to the penultimate section, while the second pulley is moveable relative to the first pulley.

3. The extendible belt conveyor as recited in claim 2, and further comprising a spring that biases the second pulley away from the first pulley.

4. The extendible belt conveyor as recited in claim 2, wherein the second pulley is mounted to an arm, which itself is pivotally mounted to a frame member of the extendible belt conveyor.

5. The extendible belt conveyor as recited in claim 1, and further comprising a third pulley that is mounted to and fixed in position relative to the penultimate section, with the third pulley also engaging the cable, such that the cable engages, in order, the first pulley, the second pulley, and the third pulley.

6. The extendible belt conveyor as recited in claim 5, wherein the first pulley, the second pulley, and the third pulley are substantially aligned in the same plane.

7. The extendible belt conveyor as recited in claim 1, wherein the channel defined by the first shoe is substantially aligned with the channel defined by the second shoe.

8. The extendible belt conveyor as recited in claim 7, wherein the cable passes below the first shoe and above the second shoe, and wherein the first pulley and the second pulley are located in substantially the same plane, which is aligned with a top of the second shoe.

9. The extendible belt conveyor as recited in claim 1, wherein the first pulley and the second pulley are aligned in a first plane, and the first shoe and the second shoe are aligned in a second plane perpendicular to the first plane, such that the cable is substantially constrained in two planes.

10. An extendible belt conveyor, comprising:
    a base;
    multiple telescoping sections, including a penultimate section;
    a boom mounted for pivotal movement with respect to the penultimate section, the boom including user controls on a surface thereof for controlling operation of the extendible belt conveyor;
    a cable extending from the user controls of the boom;
    a first shoe mounted to an underside of the boom near a proximal end of the boom, the first shoe defining a channel for receiving the cable, wherein the cable is in contact with and passes around the first shoe within the channel defined by the first shoe;
    a second shoe mounted to an underside of the penultimate section near a distal end of the penultimate section, the second shoe defining a channel for receiving the cable, wherein the cable is in contact with and passes around the second shoe within the channel defined by the second shoe; and
    a pulley subsystem which maintains tension in the cable, including
       a first pulley mounted to the underside of the penultimate section, the first pulley engaging the cable,
       a second pulley mounted to the underside of the penultimate section, the second pulley engaging the cable,
       a third pulley mounted to the underside of the penultimate section, the third pulley engaging the cable,
       wherein the cable engages, in order, the first pulley, the second pulley, and the third pulley, and
       wherein the first pulley and the third pulley are each fixed in position relative to the penultimate section, while the second pulley is moveable relative to the first pulley and the third pulley to maintain tension in the cable.

11. The extendible belt conveyor as recited in claim 10, wherein the channel defined by the first shoe is substantially aligned with the channel defined by the second shoe.

12. The extendible belt conveyor as recited in claim 10, wherein the cable passes below the first shoe and above the second shoe.

13. The extendible belt conveyor as recited in claim 10, wherein, when the boom pivots relative to the penultimate section, the cable slides over the second shoe while a position of the cable relative to the first shoe remains substantially fixed.

14. An extendible belt conveyor, comprising:
    a base;
    multiple telescoping sections, including a penultimate section;
    a boom mounted for pivotal movement with respect to the penultimate section, the boom including user controls on a surface thereof for controlling operation of the extendible belt conveyor;
    a cable extending from the user controls of the boom;
    a first shoe mounted to an underside of the boom near a proximal end of the boom, the first shoe defining a channel for receiving the cable, wherein the cable is in contact with and passes around the first shoe within the channel defined by the first shoe;

a second shoe mounted to an underside of the penultimate section near a distal end of the penultimate section, the second shoe defining a channel for receiving the cable, wherein the cable is in contact with and passes around the second shoe within the channel defined by the second shoe; and a pulley subsystem which maintains tension in the cable, including a first pulley mounted to and fixed in position relative to a first frame member of the extendible belt conveyor, a second pulley mounted to an arm, which itself is pivotally mounted to a second frame member of the extendible belt conveyor, a third pulley mounted to and fixed in position relative to a third frame member of the extendible belt conveyor, a spring that biases the second pulley from the first pulley and the third pulley, wherein, the cable passes around the first pulley, the second pulley, and the third pulley, and wherein, in use, the second pulley can move closer to the first pulley and the third pulley, as the arm pivots relative to the second frame member of the extendible belt conveyor.

15. A cable management system operably connected to an extendible belt conveyor with a boom mounted for pivotal movement with respect to a penultimate section of the extendible belt conveyor and a cable extending from user controls on the boom to the penultimate section, the cable management system comprising:

a first shoe mounted to an underside of the boom near the penultimate section, the first shoe defining a channel for receiving the cable;

a second shoe mounted to an underside of the penultimate section near the boom, the second shoe defining a channel for receiving the cable;

a first pulley that engages the cable, with the cable contacting and passing around the first pulley;

a second pulley that engages the cable, with the cable contacting and passing around the second pulley;

a third pulley that engages the cable, with the cable contacting and passing around the third pulley; and a spring that biases the second pulley away from the first pulley and the third pulley to maintain tension in the cable;

wherein the cable is in contact with and passes around the first shoe within the channel defined by the first shoe;

wherein the cable is in contact with and passes around the second shoe within the channel defined by the second shoe;

wherein the channel of the first shoe is substantially aligned with the channel of the second shoe along a first plane; and wherein the first pulley, the second pulley, and the third pulley are all located in a second plane, such that the cable is constrained within two planes.

16. The cable management system as recited in claim 15, wherein the first pulley, the second pulley, and the third pulley are mounted to the underside of the penultimate section.

17. The cable management system as recited in claim 16, wherein the second pulley is mounted to an arm, which itself is pivotally mounted to a frame member of the penultimate section.

18. The cable management system as recited in claim 17, wherein the spring extends between and is connected to the arm and another frame member of the penultimate section to bias the arm, and thus the second pulley, away from the first pulley and the third pulley to maintain tension in the cable.

* * * * *